United States Patent
Nerheim (10) Patent No.: US 10,866,070 B2
(45) Date of Patent: Dec. 15, 2020

(54) SYSTEMS AND METHODS FOR DETECTING A DISTANCE BETWEEN A CONDUCTED ELECTRICAL WEAPON AND A TARGET

(71) Applicant: Axon Enterprise, Inc., Scottsdale, AZ (US)

(72) Inventor: Magne Nerheim, Paradise Valley, AZ (US)

(73) Assignee: Axon Enterprise, Inc., Scottsdale, AZ (US)

(*) Notice: Subject to any disclaimer, the term of this patent is extended or adjusted under 35 U.S.C. 154(b) by 0 days.

(21) Appl. No.: 16/025,300

(22) Filed: Jul. 2, 2018

(65) Prior Publication Data
US 2019/0376768 A1  Dec. 12, 2019

Related U.S. Application Data

(60) Provisional application No. 62/682,504, filed on Jun. 8, 2018.

(51) Int. Cl.
*G06G 7/80* (2006.01)
*F41H 13/00* (2006.01)
*G01S 17/48* (2006.01)

(52) U.S. Cl.
CPC .......... *F41H 13/0025* (2013.01); *G01S 17/48* (2013.01)

(58) Field of Classification Search
CPC ..................................... F41G 3/06; F41G 3/08
(Continued)

(56) References Cited

U.S. PATENT DOCUMENTS 5,903,996 A   5/1999  Morley
7,631,452 B1  12/2009 Brundula et al.
(Continued)

FOREIGN PATENT DOCUMENTS

CN   103959049 A   7/2014
EP     2276050 A2   1/2011
(Continued)

OTHER PUBLICATIONS

Patent Cooperation Treaty, International Search Report and Written Opinion of the International Searching Authority for international application PCT/US18/40574 dated Mar. 8, 2019.
(Continued)

*Primary Examiner* — Daniel St Cyr
(74) *Attorney, Agent, or Firm* — Letham Law Firm (57) ABSTRACT

A shield cooperates with a detector to determine the distance between a conducted electrical weapon ("CEW") and a target. The CEW includes a laser for aiming the CEW. The shield cooperates with the detector to block or pass laser light that reflects from a target. The position of the shield with respect to the detector may be used to determine the distance between the CEW and the target. The detected distance between a CEW and a target may be used to select a deployment unit with a suitable range for launching electrodes toward a target. The detected distance between a CEW and a target may be used to determine a spread between launched electrodes at the target. The spread may be used to determine a likely effectiveness of a stimulus signal on the target. The detected distance, and any information associated with the detected distance may be stored in a memory.

20 Claims, 7 Drawing Sheets

(58) Field of Classification Search
USPC .................................... 235/414, 415, 416
See application file for complete search history.

(56) References Cited

U.S. PATENT DOCUMENTS

| | | | |
|---|---|---|---|
| 7,900,388 | B2 | 3/2011 | Brundula et al. |
| 9,025,304 | B2 * | 5/2015 | Brundula .................. F41H 5/24 |
| | | | 361/232 |
| 10,072,909 | B2 * | 9/2018 | Heroor ................ F41H 13/0025 |
| 2011/0304840 | A1 | 12/2011 | Hsu et al. |
| 2014/0098453 | A1 | 4/2014 | Brundula et al. |
| 2017/0241751 | A1 | 8/2017 | Nerheim |

FOREIGN PATENT DOCUMENTS

| | | |
|---|---|---|
| JP | 09-318315 A | 12/1997 |
| JP | 2015230177 A | 12/2015 |
| TW | 1326351 | 6/2010 |
| TW | 1326352 | 6/2010 |

OTHER PUBLICATIONS

International Searching Authority, International Search Report and Written Opinion for International Patent Application No. PCT/US2018/040574 dated Mar. 8, 2019.
Taiwan Patent Office, Taiwan Office Action and Search Report for Taiwan patent application No. 107125634 dated Jul. 29, 2019.

* cited by examiner

FIG. 10

SYSTEMS AND METHODS FOR DETECTING A DISTANCE BETWEEN A CONDUCTED ELECTRICAL WEAPON AND A TARGET

FIELD OF INVENTION

Embodiments of the present invention relate to conducted electrical weapons.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF INVENTION

A conducted electrical weapon ("CEW") provides a stimulus signal to a human or animal target to impede locomotion of the target. A CEW may include wire-tethered electrodes (e.g., darts) positioned within separate housings. Each wire-tethered electrode is launched from its housing by a propellant toward a target. A CEW may provide (e.g., apply) a stimulus signal through a target while the launched electrodes mechanically and/or electrically couple to tissue of the target. The CEW may provide a current through the target via a circuit that includes a filament (e.g., wire-tether) coupled to a first electrode, target tissue, and a second electrode coupled to a second filament back to the CEW.

Wire-tethered electrodes may be packaged in a deployment unit (e.g., cartridge). A deployment unit may be inserted into a CEW to perform the functions of launching the electrodes and delivering the stimulus signal. A deployment unit may be rated (e.g., described, categorized) by the length of the wire tethered to the electrodes. The length of the wire may be referred to as the range of the deployment unit. The range of a deployment unit may be described as short (e.g., 12 feet), medium (e.g., 20 feet), and long (e.g., 30 feet). A CEW that accepts two or more deployment units that have different ranges. Knowing the distance from the CEW to the target enables a CEW with two or more cartridges of different ranges to select the cartridge that has a suitable range to deliver the electrodes to the target.

Knowing the distance from the CEW to the target enables the CEW to determine a likely effect of the stimulus signal on the target. A stimulus signal impedes the locomotion of the target. Locomotion may be inhibited by interfering with voluntary use of skeletal muscles and/or causing pain in the target. A stimulus signal that interferes with skeletal muscles may cause the skeletal muscles to lockup (e.g., freeze, tighten, stiffen) so that the target may not voluntarily move.

The ability of a stimulus signal to lockup the skeletal muscles of a target increases with the distance between the electrodes that deliver the stimulus signal through the target. A greater distance between electrodes provides the stimulus signal through more target tissue thereby increasing the likelihood of skeletal muscle lockup. A spacing (e.g., spread, separation) of at least seven inches between electrodes, so that the stimulus signal travels through at least seven inches of target tissue, increases the likelihood of skeletal muscle lockup.

Electrodes are positioned in separate bores (e.g., housing) in a deployment unit prior to launch. To achieve a spacing between the electrodes when the reach the target, one bore may be positioned at an angle relative to another bore. When electrodes launch from bores oriented with an angle to each other, the trajectory of the electrodes have the same angle between them. For a particular angle between bores, the distance to the target determines the spread between the electrodes when they reach the target. For example, for an angle of 8 degrees between the bores achieves a separation of 7 inches at 4.14 feet from the target.

Knowing the distance from the CEW to the target and relative angle between electrodes at launch permits the spread of the electrodes on the target to be calculated. A CEW that can detect the distance between the CEW and the target may calculate the spread of the electrodes upon reaching the target. Because a CEW can detect when the stimulus signal is provided through a target, a CEW that can detect the distance to the target, can calculate the spread between the electrodes, detect whether the stimulus signal was delivered through the target, and record the information in a log. A log may be stored in a memory. Information regarding the distance to a target, the spread of the electrodes, and the delivery of the stimulus signal through the target may be used to determine a likely effect of the stimulus signal on the target. Recording the distance, the calculated spread, and the delivery of the current may be used as evidence of delivery of a stimulus signal and the possible effect of the current on the target. The information may be used to determine whether the stimulus signal resulted in the muscles of the target locking up.

A stimulus signal may include a plurality of pulses of current (e.g., current pulses). Each pulse of current is delivered at a voltage. Each pulse of current delivers energy (e.g., microcoulombs) to a target. A voltage of the pulse of current may vary over the duration of the pulse. A voltage of at least a portion of a pulse may be of sufficient magnitude (e.g., 50,000 volts) to ionize air in a gap to establish a circuit to deliver the current to a target. A gap of air may exist between an electrode (e.g., dart) and tissue of the target. Ionization of air in the gap establishes an ionization path of low impedance for delivery of the current to target tissue. Each pulse of current may deliver an amount of charge to target tissue. The charge delivered by one or more pulses of a stimulus signal may interfere with locomotion of the target as discussed above.

A CEW may include a laser sight which generates a beam of light to aid in aiming the CEW at a target. When a beam of light from a laser sight strikes a target, the light forms a spot on the target to indicate the likely location of impact of an electrode on the target. A CEW that launches two or more electrodes may include one or more laser sights. The color of the light provided by the laser may be any frequency (e.g., color). In an implementation, a green laser is used to indicate the trajectory of one electrode (e.g., top, straight) while a red laser is used to indicate the trajectory of another electrode (e.g., bottom, angled).

Light from the laser beam scatters (e.g., reflects) from the target. One or more detectors may detect the scattered light. A detector may detect the presence and/or absence of scattered light. The circuitry that detects the scattered light may determine the distance, or a range of distances, between the CEW and the target.

A CEW with circuitry to determine distance may include a laser beam for aiming at a target, one or more detectors for detecting scattered light from a laser spot on the target, and a shield (e.g., barrier, cover, screen) for constraining (e.g., controlling, directing, blocking) the light that can reach a detector. A shield may be positioned between one or more detectors in a CEW and the light scattered from a target. A size of a shield and/or a position of a shield with respect to one or more detector and/or the orientation of the one or more detectors with respect to the shield may determine whether scattered light reaches one or more detector. A shield may shield (e.g., block) a path of scattered light from a target to a detector. A shield may block a portion or all the scattered light from a target. A shield may permit only a portion of the scattered light to reach a detector.

Circuitry that detects the scattered light may determine whether a target is positioned within or outside of a particular distance of a CEW. For example, the circuitry may determine when a target is within 9 feet of a CEW or when the target is more than 9 feet from the CEW. Determining whether a target is within a particular distance or farther away than a particular distance may be used to select a deployment unit with a suitable range for launching electrodes toward the target.

For example, a CEW that has a short-range (e.g., 12 feet) deployment unit and a long-range (e.g., 30 feet) deployment unit may select the short-range deployment unit for a target that is 9 feet or closer to the CEW. If the target is more than 9 feet away from the CEW, the CEW may select the long-range deployment unit for launching electrodes at the target.

Figure 1:
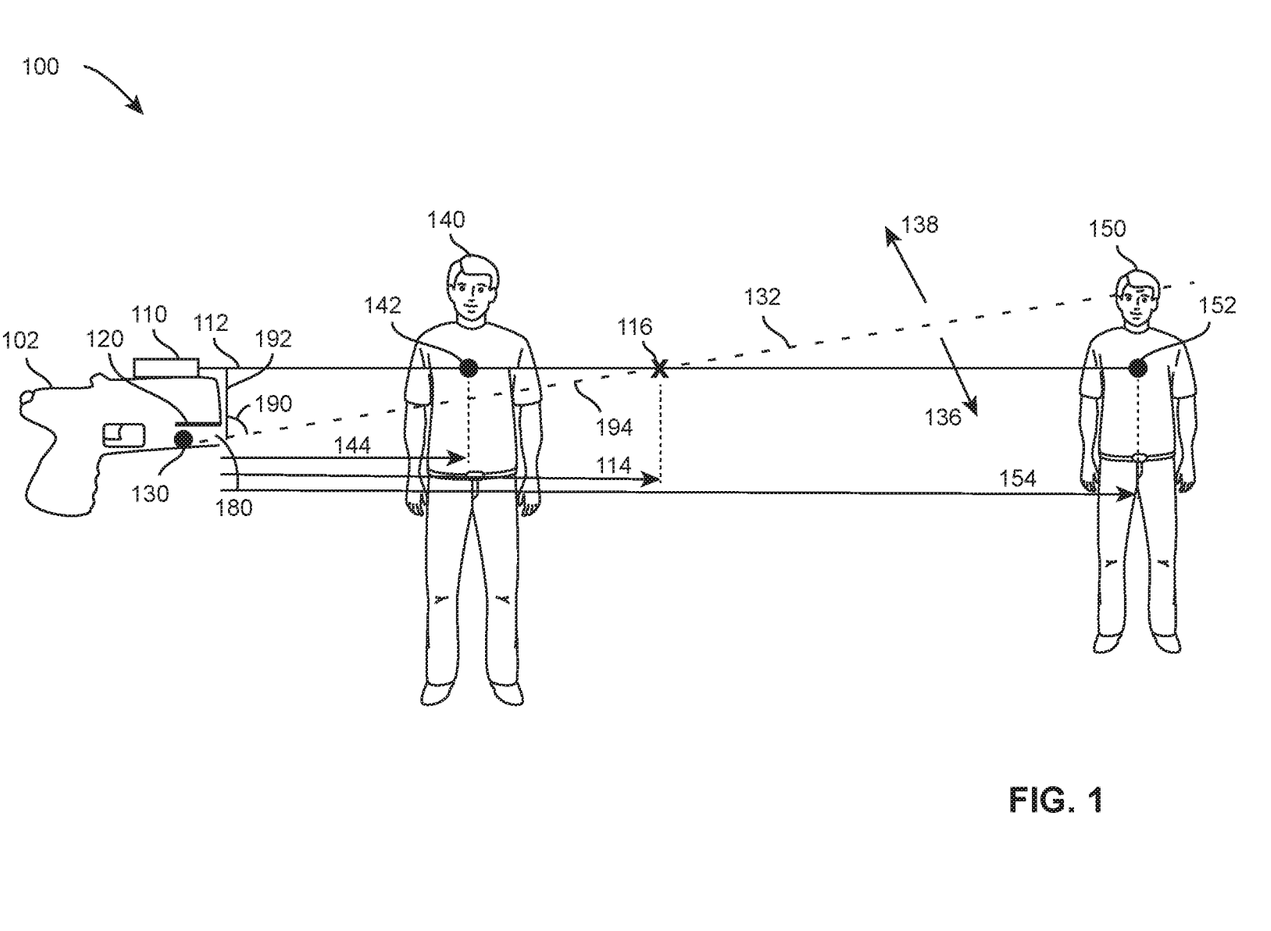
FIG. 1 is a diagram of a CEW according to various aspects of the present disclosure.

In an implementation, referring to FIG. 1, CEW 102 includes laser 110, shield 120, detector 130, and opening 180. Laser 110, shield 120, and detector 130 perform the functions of a laser, shield and detector as discussed above.

Laser 110 provides a beam of light (e.g., beam) 112. Beam 112 is aimed by a user of CEW 102 toward a target. When beam 112 strikes a target, beam 112 forms a spot of light on the target. For example, when beam 112 strikes target 140, spot 142 forms on target 140. When beam 112 strikes target 150, spot 152 forms on target 150. Light from beam 112 may scatter (e.g., reflect, bounce off) from a target. Light scattered from a target may travel toward CEW 102. Detector 130 in cooperation with shield 120 may detect at least a portion of the light scattered from a target. For example, light scattered from target 140 may be blocked by shield 120 so that no part of the scattered light from target 140 reaches detector 130. In another example, at least a portion of light scattered by target 150 may bypass shield 120 to be detected by detector 130.

Whether scattered light from a target reaches detector 130 is determined by the position of shield 120 with respect to detector 130 and the targets. A shield that blocks scattered light establishes a boundary between a CEW and a target. The boundary established by a shield may be referred to as a detection boundary or simply a boundary. Scattered light from a target on a first side of the boundary cannot be reach the detector, so the detector cannot detect targets positioned on a first side of the boundary. Scattered light from a target on a second side of the boundary may be detected by the detector, so the detector can detect targets positioned on a second side of the boundary.

A detection boundary may intersect the laser beam. A point of intersection (e.g., crossover point, crossover) between the detection boundary and a laser beam may lie between the CEW and the target. The distance from the CEW to the crossover point may be referred to as the crossover distance. In an implementation, a target closer to the CEW than the crossover distance cannot be detected by the detector at the CEW. In another implementation, light scattered from a target that is farther from the CEW than the crossover distance cannot be detected by the detector at the CEW. In another implementation, the structure (e.g., shape, openings) of the shield cooperates with a first detector that is positioned to detect light scattered from targets that are closer than the crossover distance, but not light from a target that is farther away than the crossover distance and a second detector that is positioned to detect light scattered from targets that are farther away than the crossover distance, but not light from a target that is at or closer than the crossover distance.

As discussed above, shield 120 establishes (e.g., creates) boundary 132. Scattered light from targets on side 138 of boundary 132 is blocked by shield 120, so the scattered light from targets on side 138 of the boundary cannot reach detector 130. Because detector 130 cannot detect scattered light from side 138 of boundary 132, detector 130 cannot detect target 140. At least a portion of scattered light from targets on side 136 of boundary 132 bypasses shield 120 to reach detector 130. Because detector 130 can detect scattered light from side 136 of boundary 132, detector 130 can detect scattered light from target 150, but not from target 140. In this implementation, detector 130 of CEW 102 may determine that target 150 is at least a specific distance (e.g., crossover distance 114) away from CEW 102.

If position of shield 120 where changed with respect to detector 130 (e.g., moved below detector 130), the scattered light from targets on side 136 of the boundary cannot reach detector 130. Because detector 130 cannot detect scattered light from side 136 of boundary 132, detector 130 cannot detect target 150. Because detector 130 can detect scattered light from side 138 of boundary 132, detector 130 can detect scattered light from target 140, but not from target 150. In this implementation, detector 130 of CEW 102 may determine that target 140 is less than a specific distance (e.g., crossover distance 114) away from CEW 102.

As discussed above, determining that a target is closer than or farther away than a specific distance (e.g., crossover distance 114) may provide information for selecting a cartridge that has a suitable range for launching electrodes that may reach the target.

The distance between CEW 102 and a target may be defined by crossover (e.g., crossover point) 116. Crossover 116 is the intersection between boundary 132 and beam 112. The position of shield 120 with respect to detector 130, and/or opening 180, determines boundary 132 and crossover 116. Shield 120 and/or detector 130 may be moved to change the position of crossover 116 with respect to beam 112. The distance from CEW 102 to crossover 116 determines crossover distance 114.

As discussed above, shield 120 and detector 130 may be positioned relative to each other so that targets that are closer to CEW 102 than crossover distance 114 lie on side 138 of boundary 132 and cannot be detected by detector 130. Targets that are farther away from CEW 102 than crossover distance 114 lie on side 136 of boundary 132 and may be detected by detector 130. In this example, the distance from CEW 102 to target 140 is distance 144. Because distance 144 is less than crossover distance 114, scattered light from target 140 cannot be detected by detector 130, so detector 130 cannot detect target 140. The distance from CEW 102 to target 150 is distance 154. Because distance 154 is greater than crossover distance 114, at least a portion of the scattered light from target 150 can be detected by detector 130, so detector 130 can detect target 150.

In another implementation, as discussed above, the position of shield 120 with respect to detector 130 may be changed so that targets that are closer to CEW 102 than crossover distance 114 that lie on side 138 of boundary 132 can be detected by detector 130 and targets that are farther away than crossover distance 114 that lie on side 136 of boundary 132 cannot be detected by detector 130.

In another implementation, as discussed above, two detectors may be used to detect targets that are closer and farther away than a crossover distance. In this implementation, a first detector 130 may be positioned relative to shield 120 (e.g., below) to detect targets that are farther away than crossover distance 114 and a second detector 130 is positioned relative to a shield (e.g., below) to detect targets that are closer than crossover distance 114.

Detecting the distance between a CEW, even a minimum distance or a maximum distance (e.g., crossover distance), may aid in selecting a deployment unit having a particular range. Detecting a minimum distance or a maximum distance between a CEW and a target may also aid in determining the spread (e.g., spacing, distance) between two electrodes positioned on or near a target.

As discussed above, a CEW may launch one electrode at an angle relative to other darts so the electrodes separate from each other during flight. As launched electrodes fly away from a CEW, the electrodes separate from each other as a function of distance flown. A relationship between the distance from a CEW and distance between (e.g., spread of) electrodes at the target may be calculated using a right triangle. Generally, one electrode flies away from the CEW along a trajectory that is parallel with the orientation of the CEW. A laser sight may be used to show the trajectory parallel with the orientation of the CEW (e.g., straight). The trajectory in parallel with the orientation of the CEW may be represented by the adjacent side of a triangle. The second electrode travels a trajectory that is at an angle compared to the trajectory of the first electrode. The trajectory of the second electrode may be represented by the hypotenuse of the right triangle. The distance between the electrodes at the target corresponds to the opposite side of the right triangle. Because the angle between the trajectories of the electrodes is known, the spread of the electrodes at the target may be determined if the distance between the CEW and the target is known.

Figure 2:
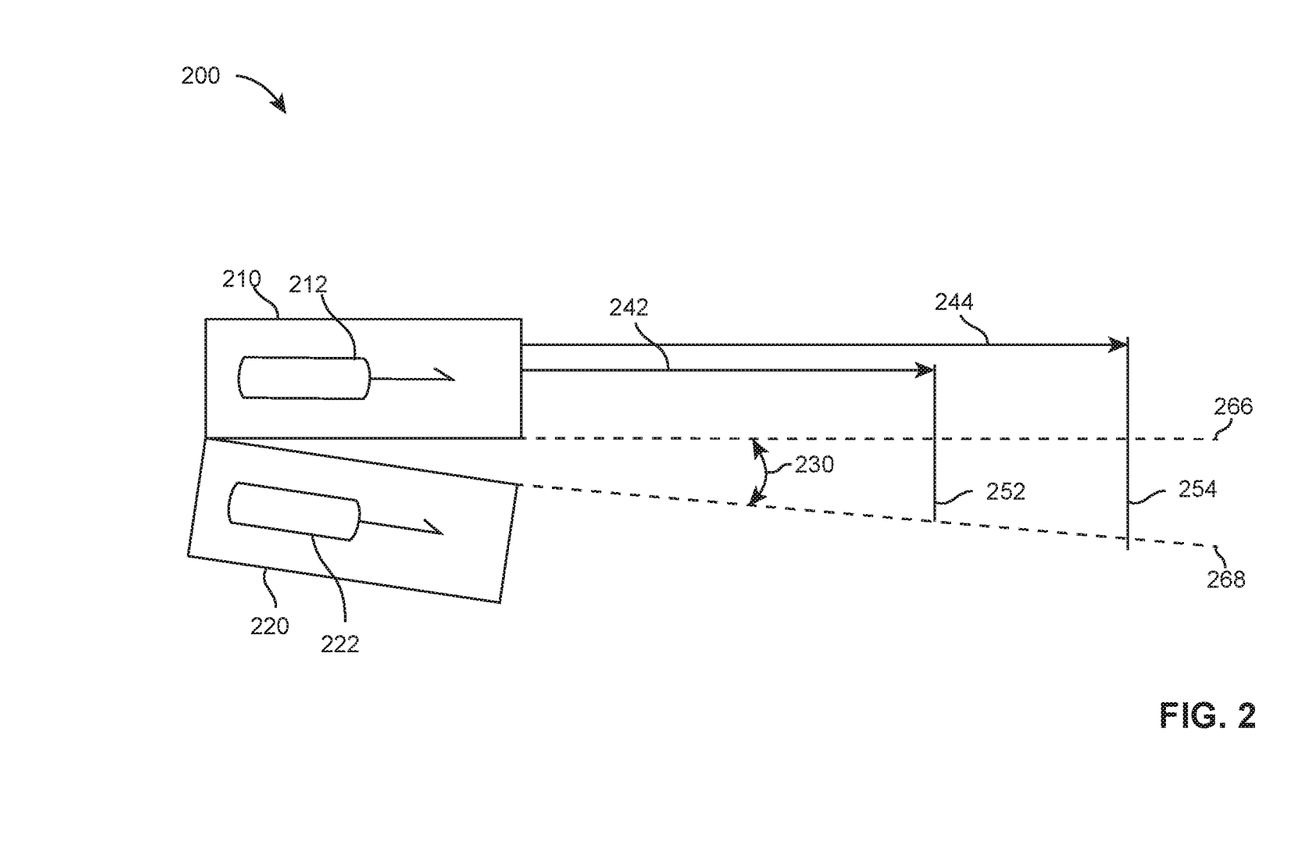
FIG. 2 is diagram of electrodes in bores of a conducted electrical weapon ("CEW")

For example, FIG. 2 shows electrode 212 positioned within bore 210 and electrode 222 positioned within bore 220. Bores 210 and 220 perform the function of a bore discussed above. Electrodes 212 and 222 perform the function of an electrode as discussed above. Bore 210 and bore 220 are positioned at angle 230 to each other. Line 266, line 268, and spread 252 or spread 254 represent the adjacent, hypotenuse, and opposite sides of the right triangle as discussed above. At distance 242, the distance between the electrodes is spread 252. At distance 244, the distance between the electrodes is spread 254.

The spread between electrode 212 and 222 at a target may be determined by the formula:

$$\text{Spread} = \text{distance} \cdot \tan(\text{angle})$$

For a distance 242 away from the CEW, spread 252=distance 242\*tangent (angle 230). For a distance 244 away from the CEW, spread 254=distance 244\*tangent (angle 230). Determining the distance between the CEW and the target permits the spread between the electrodes at the target to be calculated.

As discussed above, a CEW with a fixed (e.g., set, unchangeable) may be used to select a deployment unit having an appropriate range to launch toward a target. The crossover distance of a CEW may be further set so that a detector will not detect targets that are too close to provide a spread of at least seven inches, but and detect targets that are far enough away to provide a spread of at least seven inches.

Using the formula for a right triangle discussed above, crossover distance may be set so that targets that are far enough away to result in a spread of seven or more inches between electrodes are detected and targets that are too close to result in a spread of seven or more inches are not detected.

$$\text{Target Distance} = \frac{\text{Electrode Spread}}{\tan(\text{angle between electrodes})}$$

For example, with a set angle of about 8 degrees between the launched electrodes, the distance to the target can be determined where the minimum desired spread of at about 7 inches between the electrodes exists when the electrodes reach a target. The minimum distance from the CEW to a target to achieve a spread of at least 7 inches is 4.4 feet.

The spread of 7 inches between electrodes at the target is used as an example of a desired distance to induce muscle lockup with the stimulus signal. Any spread may be used as the desired spread. Preferably, the spread is six or more inches.

In an implementation, a shield may be positioned to set the detection boundary at the distance to a target which achieves the desired spread of electrodes at the target. In the above example, boundary 132 would be set to provide a crossover distance of about 4.4 feet. Detector 130 will detect scattered light from a target that is at least 4.4 feet away from CEW 102, so the spread between the electrodes at targets that are detected by detector 130 will be at least the desired spread.

The above examples discuss a CEW that has a fixed crossover distance. A fixed position between the shield and the detector provide a fixed crossover distance. However, the position of the shield with respect to the detector, or detectors, does not need to be fixed. Moving a shield with respect to one or more detectors or vice versa changes the crossover distance. Varying the crossover distance may enable a CEW to determine the distance between the CEW and one or more targets.

Figure 3:
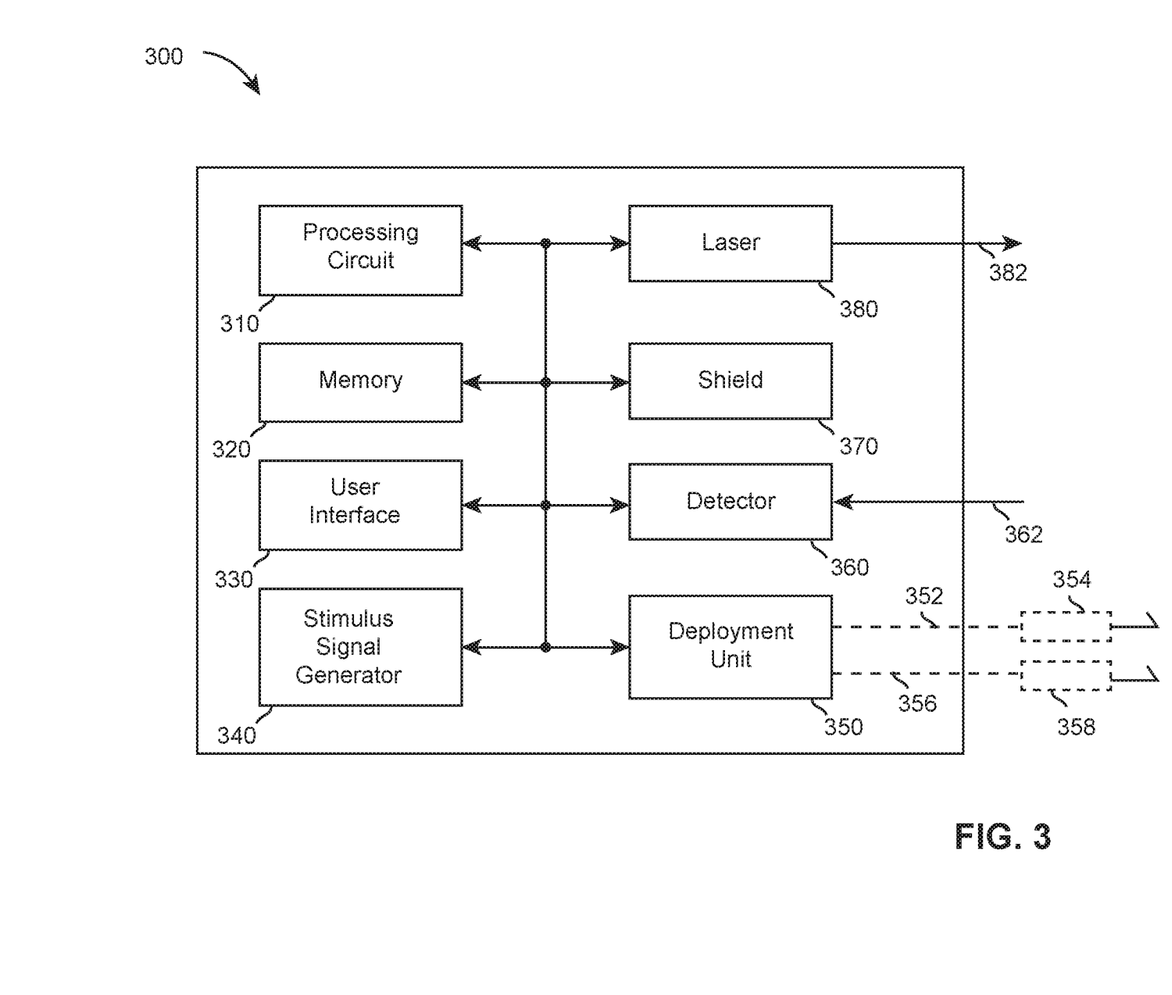
FIG. 3 is a block diagram of the CEW of FIG. 1.

An implementation of a CEW is shown in FIG. 3. CEW 300 includes processing circuit 310, memory 320, user interface 330, stimulus signal generator 340, laser 380, shield 370, detector 360, and deployment unit 350. Deployment unit 350 includes electrodes 354 and 358 that are launched from deployment unit 350 toward a target. Electrodes 354 and 358 are tethered to deployment unit 350 and/or CEW 300 by wires 352 and 356 respectively. Laser 380, shield 370, detector 360, and deployment unit 350 may perform the functions of a laser, a shield, a detector, and a deployment unit discussed above.

A laser may produce a coherent beam of light (e.g. laser beam). A coherent light source (e.g. a laser) emits photons at a single frequency. A coherent light source may produce a narrow beam of light which incurs little diffraction and loss of power when projected over a distance. A laser beam may provide light at any suitable frequency to provide a beam of light. A laser beam that strikes (e.g., hits, illuminates) a target may illuminate an area (e.g., spot) on the target. The area illuminated by the laser beam on the target may scatter light that may be detected by a detector at the CEW.

A shield may occlude (e.g., block) a beam of light. A shield may occlude light scattered from a beam of light. A shield may be of any shape and/or size. A shield may be stationary (e.g., fixed position). A shield may be moveable. A shield may be positioned with respect to a detector. A shield may move with respect to a detector. The position of a shield with respect to a detector may block light (e.g., beam, scattered) so that the light does not reach the detector. The position of a shield with respect to a detector may permit light (e.g., beam, scattered) to pass (e.g., bypass) the shield so that it reaches the detector.

As discussed above, the interaction of a shield and a detector with respect to light produces a boundary. Light on one side of boundary may be detected by the detector. Light on the other side of the boundary may not be detected by the detector. The boundary establishes a crossover distance. The detector does not detect light from targets positioned closer to the CEW than the crossover distance. The detector may detect light from targets positioned at or farther away than the crossover distance.

A shield may be positioned relative to a detector so that the detector does not detect light from targets positioned at or farther away than the crossover distance and detects light from targets positioned closer to the CEW than the crossover distance.

A shield whose position is fixed with respect to a detector establishes a fixed boundary and thereby a fixed crossover distance. A shield that may be moved with respect to the detector may establish a moveable boundary and therefore a changeable crossover distance.

A CEW is not limited to having a single shield. A CEW may include one or more shields that are positioned with respect to one or more detectors.

A detector detects (e.g., captures, notices, observes) physical properties in an environment. A detector may detect the presence of light. A detector may include one or more photosensitive sensors. A detector may distinguish differences between one or more frequencies (i.e., colors, wavelengths) of light. For example, a detector may be tuned (e.g., set, adjusted) to be sensitive to a specific frequency. The specific frequency may be provided by a laser. The presence of one or more other light sources (e.g. sunlight, other lasers, flashlights, etc.) may cause less interfere with a detector that detects the specific frequency provided by a laser.

A detector may be positioned relative to a shield. The position of a detector may be fixed relative to a shield. A detector may be moveable. A detector may move with respect to a shield.

A CEW is not limited to having a single detector. One or more detectors may be positioned with respect to a shield.

A detector may provide a report (e.g., signal, notice, data, information, transmission). A detector may provide a report regarding detecting physical properties. A detector may provide a report that it has detected light. A detector may report information (e.g., duration, frequency, lumens, direction of incident) regarded detected light. A detector may provide a report each time it detects light.

A processing circuit may receive reports from a detector. A processing circuit may determine when a detector detects light and when a detector does not detect light. A processing circuit may store information received from a detector in a memory.

A processing circuit includes any circuitry and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. For example, a processing circuit may receive analog signals from a detector. A processing circuit may process the analog signals to determine the information provided by the detector. A processing circuit may provide and/or receive digital information via a conventional bus using any conventional protocol. A processing circuit may receive information, manipulate the received information, and provide the manipulated information. A processing circuit may store information and retrieve stored information. Information received, stored and/or manipulated by the processing circuit may be used to perform a function and/or to perform a stored program.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus.

A processing circuit may detect a position of a moveable shield and/or detector. A processing circuit may control the movement of a shield and/or detector. A processing circuit may determine the position of a shield relative to a detector. A processing circuit may determine, in accordance with the positioned of a shield relative to a detector, a crossover distance. A processing circuit may move a shield and/or a detector and determine a change in the crossover distance in accordance with the movement of the shield and/or detector. A processing circuit may adjust the position of a shield and/or detector relative to each other, determine a resulting crossover distance, and monitor reports from the detector to determine a distance between a CEW and a target.

A memory may include any suitable device for storing data (e.g., information) for access by a processing circuit. A memory receives data. A memory retains (e.g., stores) data. A memory retrieves data. A memory provides data for use by a processing circuit. A memory may organize data for storage. A memory may organize data as a database for storage and/or retrieval. The operations of organizing data for storage in or retrieval from a database of a memory may be performed by a memory, a processing circuit, or any combination thereof. A memory may include a repository for persistently storing and managing collections of data. A memory may store files that are not organized in a database.

An example of a memory which includes reliable storage but also low overhead, is a file system or database management system that stores data in files (e.g., records) on a computer readable medium such as flash memory, random access memory (RAM), or hard disk drives.

Memory 320 performs the functions of a memory discussed herein. A memory may be implemented using any computer-readable medium. A processing circuit (e.g., 310) may access memory 320 locally (e.g., via a data bus), over a network, and/or as a cloud-based service. Separate memories described herein may be combined into a single memory, and/or a single memory described herein may be separated into multiple memories.

A user interface provides an interface between a user and a CEW. A user interface enables communication between a user and a CEW. A user interface enables a human user to interact with a CEW. A user may control, at least in part, a CEW via the user interface. A user may provide information and/or commands to a CEW via a user interface. A user may receive information and/or responses from a CEW via the user interface.

A user interface may include one or more controls that permit a user to interact and/or communicate with a CEW to control (e.g., influence) the operation (e.g., functions) of the CEW. A control includes any electromechanical device for operation by a user to establish or break an electrical circuit. A control may include a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, and a key lock switch (e.g., switch lock). Operation of a control may occur by the selection of a portion of a touch screen.

A user interface may provide information to a user. A user may receive visual, haptic (e.g., tactile, kinesthetic), and/or audible information from a user interface. A user may receive visual information via devices (e.g., indictors) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed. A user interface may include a communication circuit for transmitting information to an electronic device for presentation to a user. For example, a user interface may wirelessly transmit information to a smart phone for presentation to a user on the display of the smart phone.

A signal generator provides a signal (e.g., stimulus signal) for interfering with locomotion (e.g., movement) of a human or animal target. A signal may include a current. A signal may include one or more pulses of current. A pulse of current may include one or more magnitudes of voltage. A series of pulses may be delivered at a pulse rate (e.g., 22 pps, 44 pps) for a period of time (e.g., 5 seconds). Each pulse of a stimulus signal may have a pulse width.

A stimulus signal may be delivered through a target. A signal generator may provide a signal at a voltage of sufficient magnitude to ionize air in one or more gaps in series with the signal generator and the target to establish one or more ionization paths to sustain delivery of the signal through the target. The signal provided by a signal generator may provide a current through target tissue to interfere with (e.g., impede, disable) locomotion of the target. A signal generator may provide a signal at a voltage to impede locomotion of a target by inducing fear, pain, and/or an inability to voluntary control skeletal muscles.

A signal generator may receive electrical energy from a power supply. A power supply may include a battery. A signal generator may convert the energy from one form of energy into a stimulus signal for ionizing gaps of air and/or interfering with locomotion of a target.

A deployment unit may be removeably coupled to a handle. A deployment unit may include one or more electrodes. The deployment unit may receive a stimulus signal from a signal generator. The deployment unit may contain a propellant (e.g., pyrotechnic, compressed gas). A processing circuit of a CEW may provide a signal to a deployment unit to activate the propellant to launch of one or more electrodes from a deployment unit. A processing circuit may provide the signal responsive to operation of a control (e.g., trigger) of a user interface by a user of the CEW. Upon activation, the propellant propels the one or more electrodes toward a target. As the one or more electrodes fly toward the target, a respective filament deploys between the one or more electrodes and the CEW to electrically couple the electrodes to the CEW. A filament may be stored in the body of the electrodes, so that movement of the electrodes toward the target deploys the filament to bridge (e.g., span) the distance between the target and the CEW.

As discussed above, a shield may move with respect to a detector and vice versa. A processing circuit may control the position and/or movement of a shield relative to a detector. Moving a shield with respect to a detector moves the crossover point with respect to the CEW. Moving the crossover point changes the crossover distance. As the crossover point moves closer to the CEW, the crossover distance decreases. As the crossover distance decreases, the detector may detect reflected light, or miss reflected light, from targets that are closer than the crossover distance to the CEW. As the crossover point moves farther from the CEW, the crossover distance increases. As the crossover distance increases, the detector may not detect reflected light, or may detect reflected light, from targets that are closer to the CEW then the crossover distance.

A shield may be moved with respect to a detector, or vice versa, to determine the distance of a target from the CEW. For example, a shield may be moved to set (e.g., establish) a first crossover distance. If reflected light from a target is detected, the shield may be moved to increase the crossover distance. The crossover distance may be increased until the reflected light from the target is no long detected. The distance from the CEW to the target lies between the crossover distance just before the reflected light could no longer be detected and the crossover distance just after the reflected light could no longer be detected.

A processing circuit may move a shield with respect to a detector incrementally (e.g., small changes). A processing circuit may determine (e.g., calculate) a crossover distance for each incremental position of the shield. A processing circuit may monitor (e.g., detect) information from a detector. A processing circuit may detect information from a detector before, during and/or after changing a position of a shield. A processing circuit may detect when the detector detects light from a target. A processing circuit may detect when the detector does not detect light from a target. In this example, assume that the detector does not detect reflected light from targets that are closer to the CEW than the crossover distance. The processing circuit may detect reflected light from a target and adjust the position of the shield to increase the crossover distance until the reflected light from the target cannot be detected. The crossover distance determined just before the light can no longer be detected is the distance from the CEW to the target.

Because the processing circuit adjusts the shield, the processing circuit can determine the crossover distance. Because the processing circuit monitors the detector, the processing circuit can determine when light from a target is detectable and when it is not detectable. Because the processing circuit can determine the crossover point when the light is visible and when the light is not visible, the processing circuit can determine the distance from the CEW to the target.

Incremental changes in the position of a shield correlate to incremental changes in the crossover distance. The position of the shield may be change to increase and/or decrease the length of the crossover distance. The increments do not need to be uniform in size. A processing circuit may change the size of the increment at any time. A processing circuit may move a shield in large increments until the reflected light from a target can no longer be detected. The processing circuit may then reduce the size of the increment to determine the crossover distance at which the reflected light can and cannot be detected (e.g., binary search).

A processing circuit may control movement of a shield and/or detector in any manner. In an implementation, a processing circuit controls a stepper motor that moves the shield and/or detector. Correlation of the position of the shield to a crossover distance may be determined via calibration. A processing circuit may set the shield via the stepper motor to a series of positions. At each position, the crossover distance may be determined and stored.

In another implementation, a processing circuit may calculate the crossover distance using the angle of the crossover boundary line and the distance between the laser beam and the detector. For each position of shield 120, processing circuit 310 would either have stored would be able to measure or determine, angle 190 and a length of base 192. Using angle 190 and base 192 the processing circuit may calculate the crossover distance 114 using the below formulas.

$$\cos(\text{Angle } 190) = \frac{\text{Base } 192}{\text{Hypotenuse } 194}$$

$$\text{Hypotenuse } 194 = \frac{\text{Base } 192}{\cos(\text{Angle } 190)}$$

By Pythagorean's Theorem:

$$\text{Distance } 114 = \sqrt{(\text{Hypotenuse}194)^2 - (\text{Base}192)^2}$$

In another implementation, base 192, angle 190, and hypotenuse 194 are known or measured for each position of a shield. The values of base 192, angle 190, and hypotenuse 194, or the calculated of crossover distance 114, may be stored in a memory for look-up by a processing circuit for each position of a shield.

Figure 4:
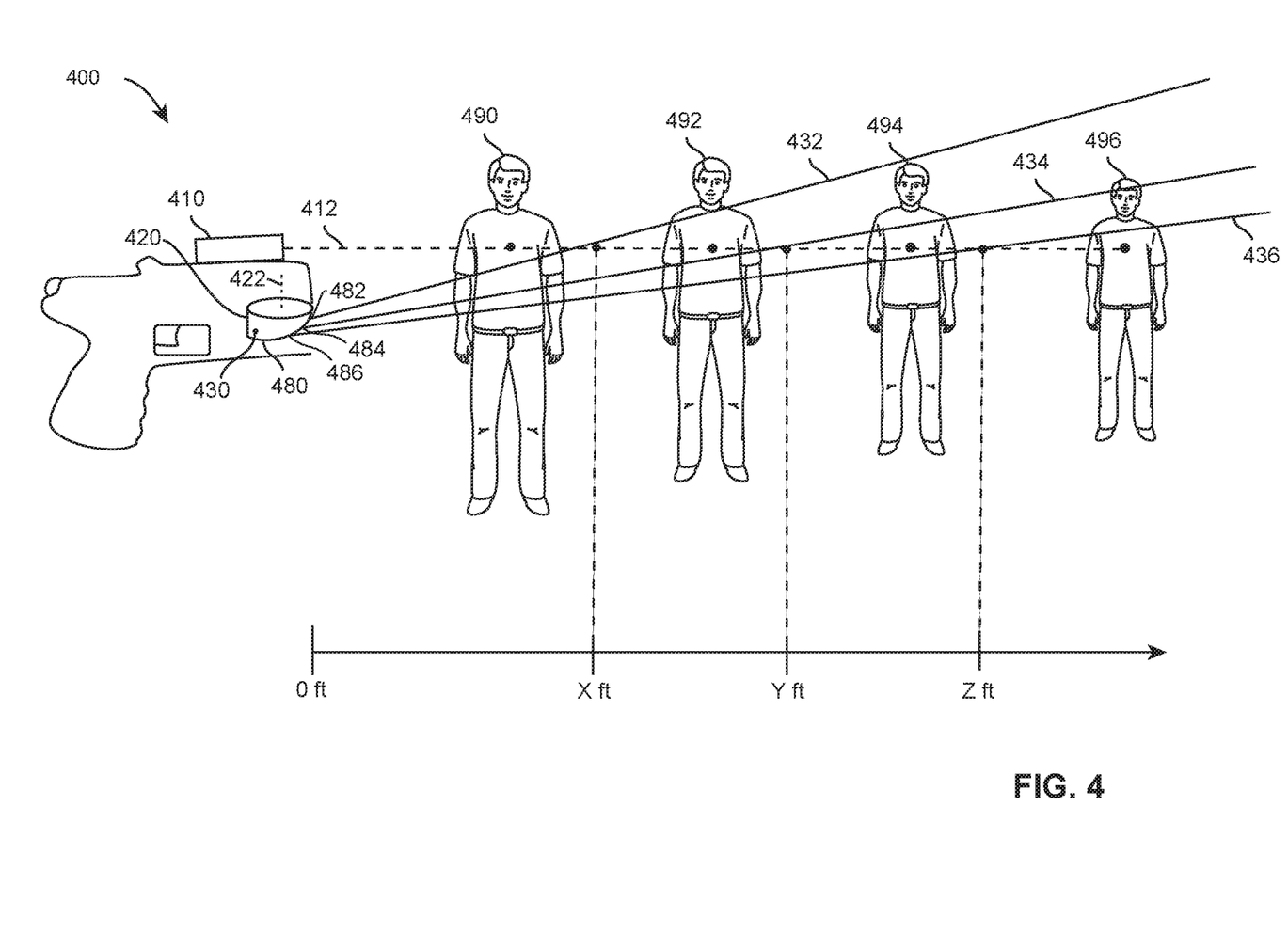
FIGS. 4-6 are diagrams of a CEW with an implementation of a shield.
Figure 5:
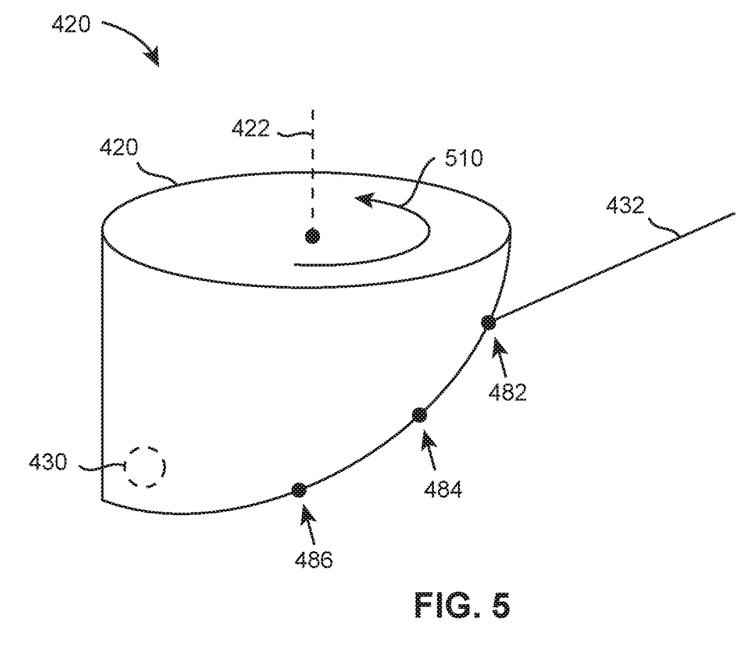
Figure 6:
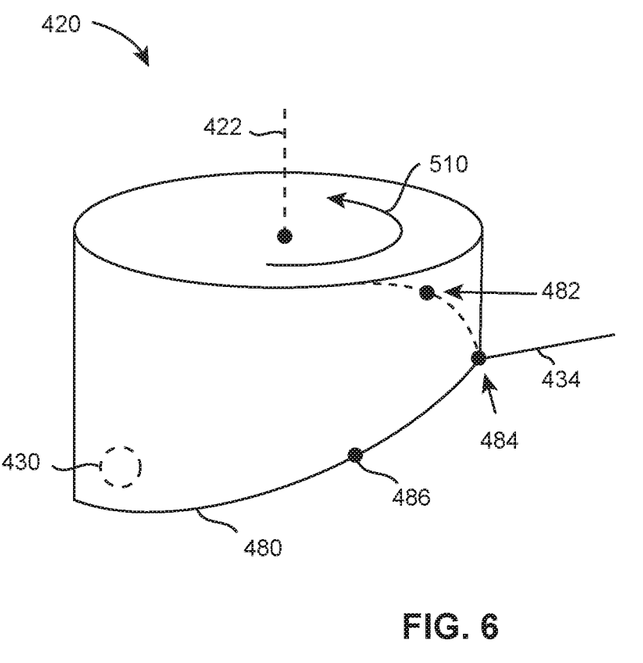

In an implementation, CEW 400 of FIGS. 4-6 includes laser 410, shield 420 and detector 430. Laser 410 provides laser beam 412. Detector 430 is positioned inside shield 420. CEW 400, laser 410, shield 420, and detector 430 perform the functions of a CEW, a laser, a shield, and a detector respectively as discuss above.

Shield 420 includes axis 422 and edge 480. Edge 480 is curved. A processing circuit may control the position of shield 420. A processing circuit may move shield 420 about axis 422. Rotating shield 420 on axis 422 positions edge 480 with respect to detector 430. As shield 420 moves counterclockwise (e.g., widdershins, direction 510) from the position shown in FIG. 4 to the position shown in FIG. 6 and beyond to point 846, edge 480 moves lower (e.g., down) with respect to detector 430. As edge 480 moves lower with respect to detector 430, shield 420 stops an increasing amount of light from reaching detector 430. So, as edge 480 moves down, the crossover distance increases. As shield 420 moves clockwise from point 486, edge 480 moves upward with respect to detector 430. As edge 480 moves upward with respect to detector 430, shield 420 permits more light to reach detector 430 and crossover distance decreases.

For example, when shield 420 is positioned as shown in FIGS. 4 and 5, point 482 on edge 480 is positioned toward the front of CEW 400. Point 482 establishes crossover boundary 432. Due to the structure of shield 420, detector 430 can detect light from a target (e.g., 492) that is below crossover boundary 432, but not light from a target (e.g., 490) that is above crossover boundary 432. Crossover boundary 432 establishes a crossover distance of X feet from the front of CEW 400 as shown in FIG. 4. Because light from objects positioned above crossover boundary 432 is blocked from reaching detector 430, detector 430 cannot detect light reflected from objects that are closer than X feet to CEW 400. Because light from objects positioned below crossover boundary 432 are not blocked by edge 480 of shield 420, CEW 400 may detect objects that are X or more feet away from CEW 400.

As shield 420 rotates counterclockwise (e.g. in direction 510), point 484 of edge 480 is positioned toward the front of CEW 400 as shown in FIG. 6. Edge 480 at point 484 is lower than point 482 with respect to detector 430, so while point 484 is positioned forward, shield 420 blocks additional light from reaching detector 430. Crossover boundary 434 represents the crossover boundary for when point 484 is positioned toward the front of CEW 400. Crossover boundary 434 establishes a crossover distance of Y feet from the front of CEW 400. Because light from objects positioned above crossover boundary 434 is block from reaching detector 430, detector 430 cannot detect light reflected from objects that are closer than Y feet from CEW 400 (e.g., 490, 492). Because light from objects positioned below crossover boundary 434 are not blocked by edge 480 of shield 420, CEW 400 may detect objects that are Y or more feet from CEW 400 (e.g., 494, 496).

Similar analysis applies to point 486 of edge 480. Point 486 establishes crossover boundary 436 with a crossover distance of Z feet. Reflected light from only target 496 is detectable by detector 430.

In this example, target 494 lies between Y and Z feet from CEW 400. Further assume that a processing circuit (e.g., 310) of CEW 400 may correlate the position of shield 420 to a crossover distance. When point 482 of edge 480 is positioned forward, the crossover distance is X feet, so detector 430 may detect reflected light from target 490. In accordance with the position of shield 420 and the information provided by detector 430 that detector 430 detects light, the processing circuit may determine that target 490 is at least X feet away from CEW 400.

When shield 420 is rotated to position point 484 toward the front of CEW 400, the crossover distance is set to Y feet. Detector 430 may still detect reflected light from target 490. In accordance with the position of shield 420 and the information from detector 430 that detector 430 detects light, the processing circuit may determine that target 490 is at least Y feet away from CEW 400.

When shield 420 is rotated to position point 486 toward the front of CEW 400, the crossover distance is set to Z feet.

While point 486 is position forward, edge 480 blocks reflected light from target 490, so detector 430 cannot detect light from target 490. In accordance with the position of shield 420 and the information from detector 430 that detector 430 does not detect light, the processing circuit may determine that target 490 is positioned somewhere between Y and Z feet away from CEW 400.

The positions of shield 420 with respect to detector 430 may have any granularity (e.g., small increments, large increments). Each position of shield 420 with respect to detector 430 relates to a respective crossover distance. Shields that move in small increments establish respective crossover distances that differ small amounts for each other thereby increasing the accuracy of the detected distance between the CEW and the target.

In an implementation, CEW 400 may have a range of crossover distances between 1 and 35 feet. The position of shield 420 may be incrementally rotated using a stepper motor. Assume that edge 480 spans only 180 degrees of the circle of shield 420, so shield 420 is rotated 180 degrees to move through the entire range of crossover distances. The stepper motor may be capable of rotating shield 420 through 180 degrees in steps. The stepper motor may move between 10 and 100 steps to rotate shield 420 through the 180 degrees of edge 480. In the case of a 10-step stepper motor, the range of crossover distances of 1 to 35 feet would be divided by 10, so each step would change the crossover distance by about 3.4 feet, so distance to a target could be resolved to a distance plus or minus 3.4 feet. In the case of a 20-step stepper motor, each step would correspond to a change in the crossover distance of 1.7 feet thereby providing accuracy of distance detection of about 1.7 feet, and so forth for increasing number of steps.

In another implementation, shield 420 may be a cylinder in which edge 480 is the same height around the entire cylinder (e.g., no curve). Slots (e.g., slits) of different height or openings (e.g., holes) at points 482, 484, and 486 may establish areas where light may pass through to detector 430 to establish the various crossover distances.

Figure 7:
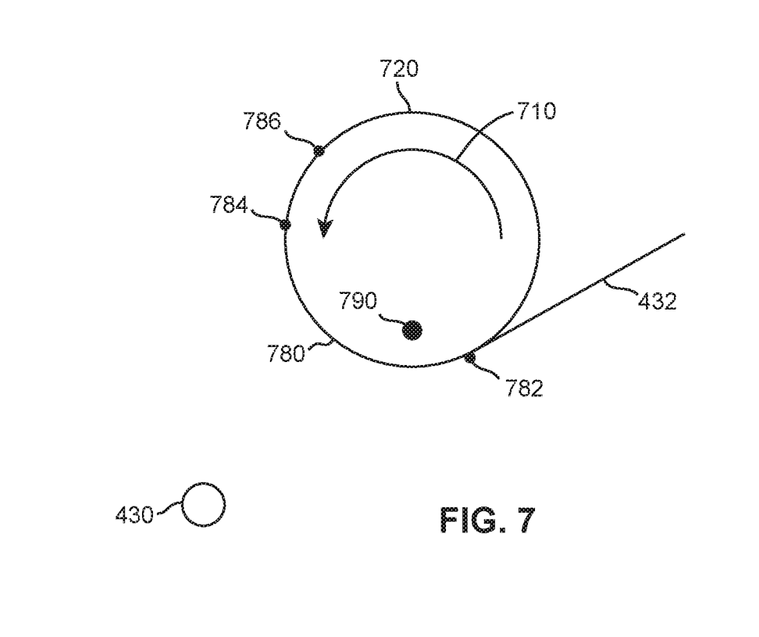
FIGS. 7-8 are another implementation of a shield.
Figure 8:
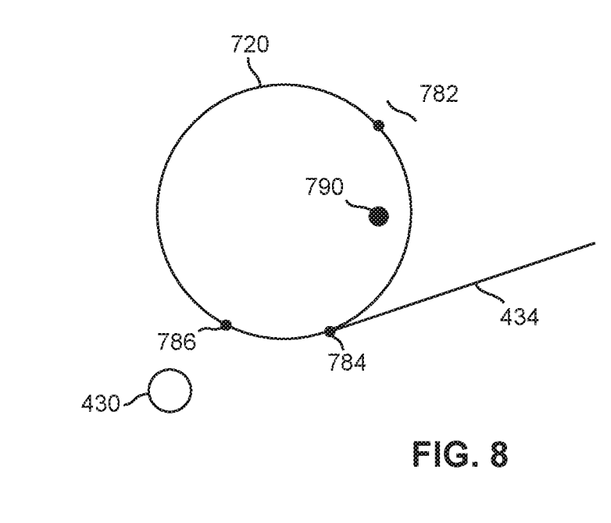

In another implementation of a shield, referring to FIGS. 7 and 8, shield 720 is implemented as a cylinder (end view shown) that rotates around axis 790 that is not central to the cylinder. FIGS. 7 and 8 include detector 430 and shield 720. The rest of the CEW (e.g., 102) is not shown for clarity of presentation. Shield 720 includes edge 780 (e.g., outer surface of the cylinder). Points 782, 784, and 786 are identified on edge 780. Shield 720 performs the functions of a shield as discussed above.

In FIG. 7, edge 780 of shield 720 is positioned with respect to detector 430 so that light above crossover boundary 432 does not reach detector 430 and light below crossover relative to detector 430. Rotating shield 720 on axis 790 positions edge 780 with respect to detector 430. As shield 720 moves counterclockwise (e.g., widdershins, direction 710) from the position shown in FIG. 7 to the position shown in FIG. 8, edge 780 moves lower (e.g., downward) with respect to detector 430. As edge 780 moves lower with respect to detector 430, shield 720 stops an increasing amount of light from reaching detector 430. As shield 720 moves clockwise from the position shown in FIG. 7, edge 780 moves upward with respect to detector 430. As edge 780 moves upward with respect to detector 430, an increasing amount of light passes edge 780 and reaches detector 430.

Points 782, 784, and 786 when positioned relative to detector 430 establish crossover boundaries 432, 434, and 436 respectively as discussed above. Targets (e.g., 490, 492, 494, 496) are visible or not visible to detector 430 when points 782, 784, and 786 are positioned to establish crossover boundaries 432, 434, and 436 and their respective crossover distances X feet, Y feet, and Z feet.

Assume that shield 720 rotates 180 degrees to provide a crossover distance range of 1 to 35 feet. Further assume, as discussed above, that a stepper motor, controlled at least in part by processing circuit 310, controls the rotation of shield 720. As discussed above, the accuracy of distance detection using shield 720 corresponds to the number of steps the stepper motor uses to move shield 720 through the 180 degrees. As discussed above, a 10-step stepper motor provides an accuracy of 3.4 feet while a 20-step stepper motor provides an accuracy of 1.7 feet.

Figure 9:
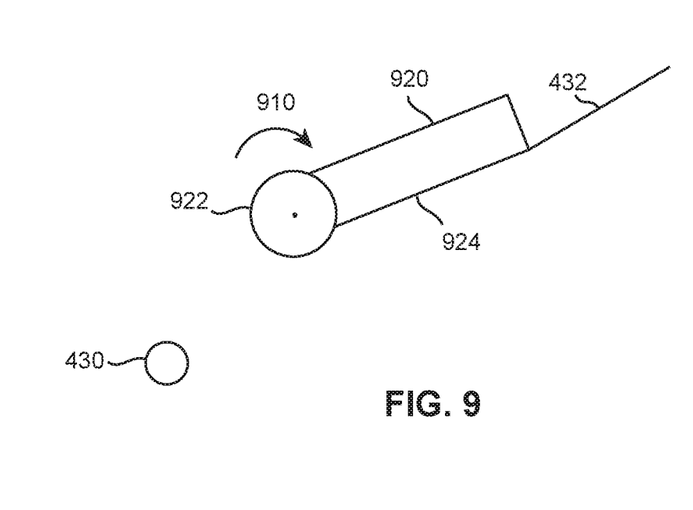
FIGS. 9-10 are another implementation of a shield.
Figure 10:
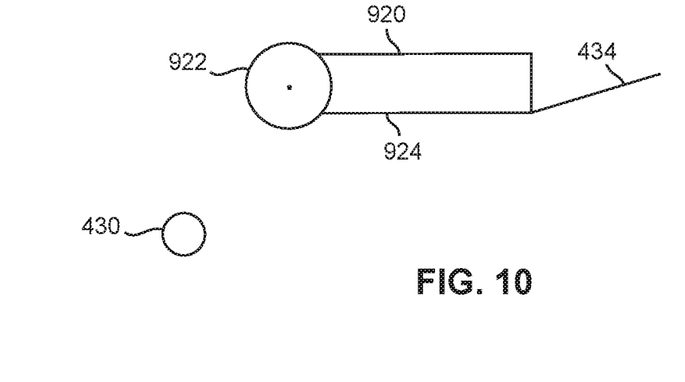

In another implementation of a shield, referring to FIGS. 9 and 10, shield 920 rotates around axis 922. The position of edge 924 with respect to detector 430 establishes a crossover boundary and a corresponding crossover distance. As shield 920 rotates clockwise, shield 920 blocks more light from detector 430 thereby lengthening the crossover distance. As shield 920 rotates counterclockwise, shield 920 permits more light to pass through to detector 430 thereby shortening the crossover distance.

The position of shield 920 relative to detector 430 as shown in FIG. 9, establishes crossover boundary 432. The position of shield 920 relative to detector 430 as shown in FIG. 10, establishes crossover boundary 434. Shield 920 may be positioned to establish crossover boundary 436. As shield 920 moves to establish crossover boundaries 432, 434, and 436, targets (e.g., 490, 492, 494, 496) are visible or not visible to detector 430 as discussed above. Further each position of shield 920 relates to a respective crossover distance as discussed above. Movements of shield 920 may have any granularity to establish any number of crossover boundaries and crossover distances as discussed above.

For this implementation, assume that shield 920 rotates 45 to provide a crossover distance range of 1 to 35 feet. Further assume, as discussed above, that a stepper motor, controlled at least in part by processing circuit 310, controls the rotation of shield 720. As discussed above, the accuracy of distance detection using shield 920 corresponds to the number of steps the stepper motor uses to move shield 720 through the 45 degrees. Because shield 920 is moved 45 degrees, as opposed to 180 degrees, to provide the range of crossover distances, the stepper motor may need to provide greater precision or more steps to provide the same accuracy of distance detection as shields 420 and 720. For example, a stepper motor capable of rotating 10 steps in 45 degrees would move 80 steps in 360 degrees, which is more than the 20 steps per 360 degrees for the stepper motors used with shields 420 and 720 as discussed above. A stepper motor capable of moving shield 920 through 45 degrees in 10 steps would provide an accuracy of distance detection of 3.4 feet, 20 steps an accuracy of 1.7 feet, and so forth.

Additional embodiments include the below.

A conducted electrical weapon ("CEW") for impeding locomotion of a human or animal target and detecting a distance from the CEW to the target, the CEW for providing a stimulus signal through the target to impede locomotion of the target, the CEW comprising: a processing circuit; a laser for providing a beam of light; a first detector for detecting light; a second detector for detecting light; and a shield; wherein: the beam of light strikes the target to provide a scattered light; a position of a shield relative to the first detector establishes a first crossover distance; the position of a shield relative to the second detector establishes a second crossover distance; the processing circuit determines a distance between the CEW and the target in accordance with the first crossover distance, the second crossover distance, and whether at least one of the first detector and the second detector detects the scattered light; and the processing circuit launches one or more electrodes toward the target to provide the stimulus signal through the target to impede locomotion of the target.

A conducted electrical weapon ("CEW") for impeding locomotion of a human or animal target and detecting a distance from the CEW to the target, the CEW for providing a stimulus signal through the target to impede locomotion of the target, the CEW comprising: a processing circuit; a laser for providing a beam of light; a detector for detecting light; a shield; wherein: the beam of light strikes the target to provide a scattered light; the detector moves relative to the shield to establish one or more crossover distances; the processing circuit determines a distance between the CEW and the target in accordance the one or more crossover distances and whether the detector detects the scattered light; and the processing circuit launches one or more electrodes toward the target to provide the stimulus signal through the target to impede locomotion of the target.

A conducted electrical weapon ("CEW") for impeding locomotion of a human or animal target and detecting a distance from the CEW to the target, the CEW for providing a stimulus signal through the target to impede locomotion of the target, the CEW comprising: a processing circuit; a laser for providing a beam of light; a detector for detecting light; a shield; wherein: the beam of light strikes the target to provide a scattered light; the shield moves relative to the detector to establish one or more crossover distances; the processing circuit determines a distance between the CEW and the target in accordance the one or more crossover distances and whether the detector detects the scattered light; and the processing circuit launches one or more electrodes toward the target to provide the stimulus signal through the target to impede locomotion of the target.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

What is claimed is:

1. A conducted electrical weapon ("CEW"), comprising:
a processing circuit;
a laser;
a detector; and
a shield;
one or more first electrodes having a first range; and
one or more second electrodes having a second range;
wherein:
the laser is configured to provide a beam of light for illuminating a spot on a target, wherein the beam of light scatters from the spot on the target to provide a scattered light;
the detector is configured to detect the scattered light;
the processing circuit is configured to move the shield from a first position relative to the detector to a second position relative to the detector to block all of the scattered light while the target is positioned less than a first distance away from the detector;
in accordance with the detector detecting none of the scattered light from the target, the processing circuit is configured to launch the one or more first electrodes having the first range; and
the first range is less than the second range.

2. The CEW of claim 1 wherein the processing circuit controls a position of at least one of the shield and the detector with respect to each other.

3. The CEW of claim 1 wherein a position of the shield and the position of the detector are fixed with respect to each other.

4. The CEW of claim 1 wherein:
the shield includes an axis and a curved edge;
the detector is positioned inside the shield; and
the shield is configured to rotate around the axis to position the curved edge with respect to the detector to block the all of the scattered light.

5. The CEW of claim 1 wherein:
the shield includes a cylinder having an axis that is not central to the cylinder; and
the shield is configured to rotate around the axis to position the cylinder with respect to the detector to block the all of the scattered light.

6. The CEW of claim 1 wherein:
the shield includes an axis and an edge; and
the shield is configured to rotate around the axis to position the edge with respect to the detector to block the all of the scattered light.

7. The CEW of claim 1, wherein in accordance with the detector detecting at least some of the scattered light from the target, the processing circuit is configured to launch the one or more second electrodes having the second range.

8. A conducted electrical weapon ("CEW") comprising:
a processing circuit;
a laser configured to provide a beam of light for illuminating a target, the beam of light reflects from the target to provide a reflected light;
a detector for detecting the reflected light;
a shield; and wherein:
the processing circuit is configured to move the shield between a first position and a second position;
the shield is configured to block the reflected light from reaching the detector;
responsive to the processing circuit moving the shield to the first position and the detector receiving no reflected light, and responsive to the processing circuit moving the shield to the second position and the detector detecting the reflected light, the processing circuit is configured to determine a range of distances between the CEW and the target; and
responsive to determining the range of distances, the processing circuit is configured to launch one or more electrodes having a range that is equal to or greater than the range of distances.

9. The CEW of claim 8 wherein:
the shield includes an axis and a curved edge;
the detector is positioned inside the shield; and
the shield is configured to rotate around the axis to the first position to position the curved edge with respect to the detector to block all the reflected light.

10. The CEW of claim 8 wherein:
the shield includes an axis and an edge; and
the shield is configured to rotate around the axis to the first position to position the edge with respect to the detector to block all the reflected light.

11. A conducted electrical weapon ("CEW") comprising:
a processing circuit;
a detector; and
a shield, the shield configured to be positioned in a plurality of positions relative to the detector, wherein the processing circuit is configured to:
rotate the shield between each position of the plurality of positions;
determine a first position of the plurality of positions at which the detector detects none of a light scattered from a target;
determine a distance from the CEW to the target in accordance with whether or not the light scattered from the target is detected at each position of the plurality of positions; and
in accordance with the first position at which the detector detects none of the light scattered from the target, select one or more electrodes for launching toward the target to provide a stimulus signal to impede locomotion of the target.

12. The CEW of claim 11 wherein the processing circuit selects the one or more electrodes having a range in accordance with the first position at which the detector detects none of the light scattered from the target.

13. The CEW of claim 11 wherein:
the shield includes an axis and a curved edge;
the detector is positioned inside the shield; and
the shield is configured to rotate around the axis to position the curved edge so that the detector detects none of the light scattered from the target.

14. The CEW of claim 11 wherein:
the shield includes a cylinder having an axis that is not central to the cylinder; and
the shield is configured to rotate around the axis to position the cylinder with respect to the detector so that the detector detects none of the light scattered from the target.

15. The CEW of claim 11 wherein:
the shield includes an axis and an edge; and
the shield is configured to rotate around the axis to position the edge with respect to the detector so that the detector detects none of the light scattered from the target.

16. A method performed by a conducted electrical weapon ("CEW") for, the method comprising:
illuminating a spot on a target with a beam of light, wherein the beam of light reflects from the spot to provide a scattered light;
moving a shield of the CEW between each position of a plurality of positions;
determining a first position of the plurality of positions at which the that a shield of the CEW blocks all the scattered light whereby a detector of the CEW detects none of the scattered light;
in accordance with determining, selecting one or more electrodes having a first range from a group of electrodes, each electrode of the group of electrodes has one of a first and a second range respectively; and
launching the one or more electrodes.

17. The method of claim 16 wherein:
the shield includes an axis and a curved edge;
the detector is positioned inside the shield; and
the shield is configured to rotate around the axis to position the curved edge so that the detector detects none of the scattered light.

18. The method of claim 16 wherein:
the shield includes a cylinder having an axis that is not central to the cylinder; and
the shield is configured to rotate around the axis to position the cylinder with respect to the detector so that the detector detects none of the scattered light.

19. The method of claim 16 wherein:
the shield includes an axis and an edge; and
the shield is configured to rotate around the axis to position the edge with respect to the detector so that the detector detects none of the scattered light.

20. The method of claim 16 wherein the first range is less than the second range.

* * * * *